United States Patent [19]
Lebreton et al.

[11] 3,791,479
[45] Feb. 12, 1974

[54] DEVICE FOR EMITTING AND RECEIVING SIGNALS IN A BORE HOLE, ELIMINATING THE INFLUENCE ON THE INTENSITY OF THE SIGNALS BEING RECEIVED OF THE SHAPE OF THE HOLE AND OF A CENTERING DEFECT OF THE DEVICE IN THE LATTER

[75] Inventors: Francisque Lebreton, Paris; Jean-Paul Sarda, Rueil-Malmaison; Pierre Morlier, Paris, all of France

[73] Assignee: Institut Francais du Petrole, des Carburants et Lubrifiants 1 & 4, Rueil-Malmaison, France

[22] Filed: Oct. 1, 1971

[21] Appl. No.: 185,712

[30]     Foreign Application Priority Data
    Oct. 1, 1970   France .............................. 7035618

[52] U.S. Cl............................... 181/.5 BE, 181/.5 P
[51] Int. Cl..................................................... G01v
[58] Field of Search. 181/.5 BE, .5 P, .5 AG, .5 ED; 340/18 R

[56]            References Cited
         UNITED STATES PATENTS
3,712,414    1/1973   Crawford ......................... 181/.5 ED
2,595,241    5/1952   Groble .............................. 181/.5 BE
3,603,145    9/1971   Morris ............................. 181/.5 BE Primary Examiner—Samuel Feinberg
Assistant Examiner—J. V. Doramus
Attorney, Agent, or Firm—Craig and Antonelli

[57]            ABSTRACT

A device for emitting and receiving signals in a bore hole with a view toward determining the characteristics of the geological formations surrounding the hole including at least one emitter and one receiver, and a support arrangement for the emitter and receiver formed by interconnected elastic support elements having a ring-shaped configuration which is capable of supporting the emitter and receiver one below the other essentially in the same diametrical plane of the hole on respective sides of the axis of the hole and in proximity to the wall of the hole at essentially predetermined equal distances from that wall.

10 Claims, 9 Drawing Figures

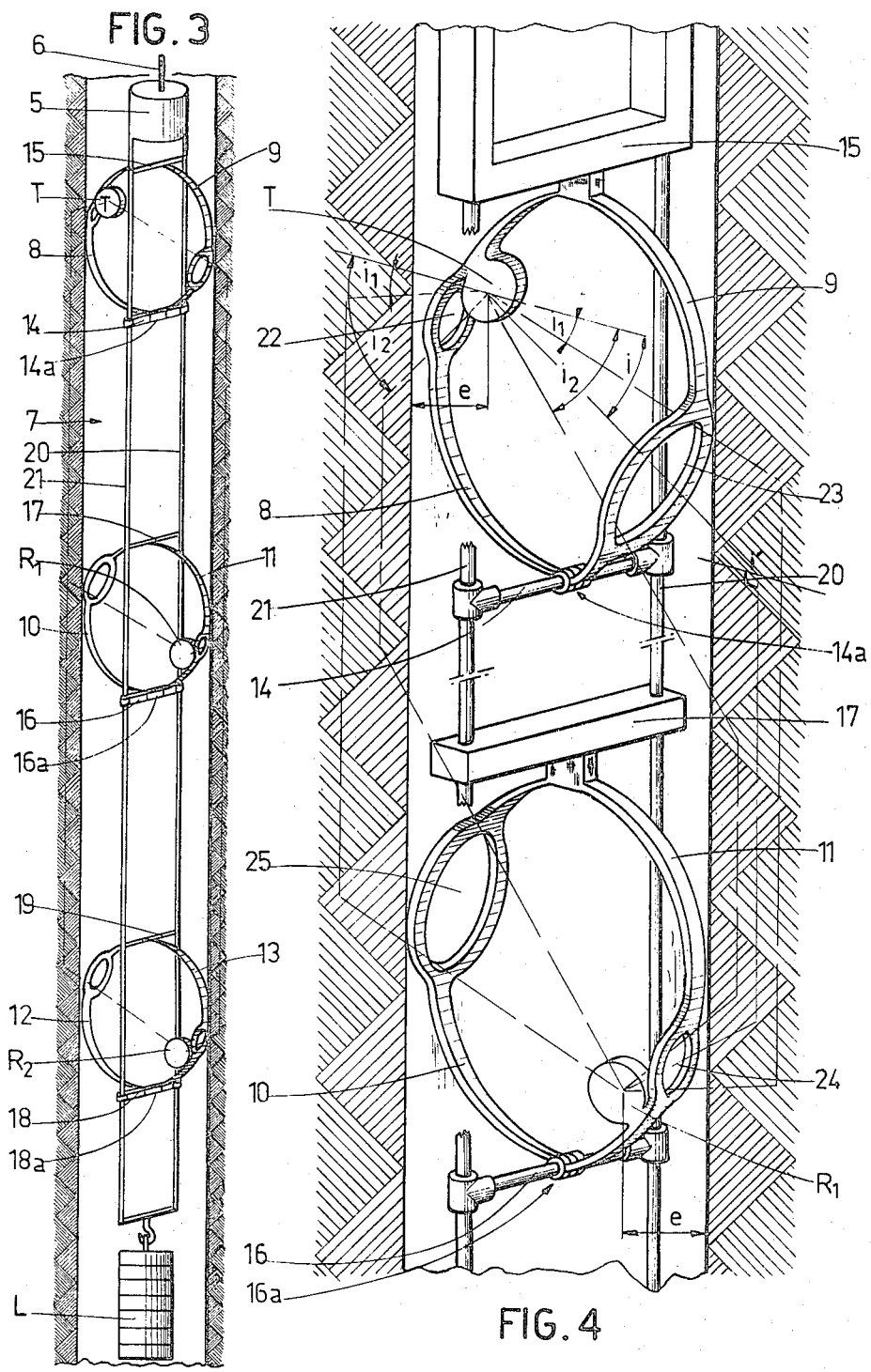

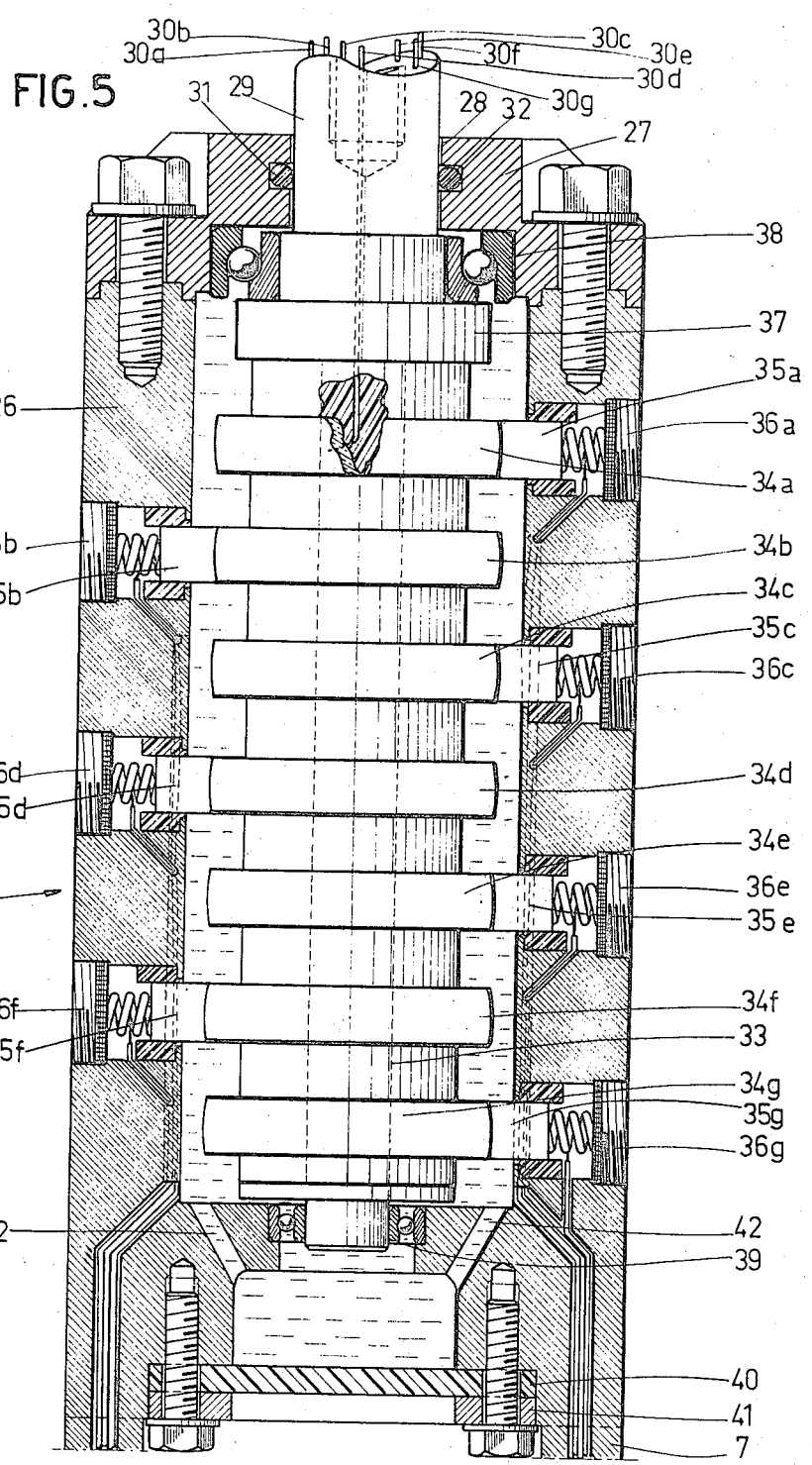

DEVICE FOR EMITTING AND RECEIVING SIGNALS IN A BARE HOLE, ELIMINATING THE INFLUENCE ON THE INTENSITY OF THE SIGNALS BEING RECEIVED OF THE SHAPE OF THE HOLE AND OF A CENTERING DEFECT OF THE DEVICE IN THE LATTER

The present invention relates to a device for emitting and receiving signals in a bore hole, which allows for eliminating the influence on the intensity of the signals being received of the shape of the hole and/or of any inaccuracy regarding the centering of the device in the latter.

Reference will be had hereinafter more particularly, and by way of example, to various embodiments of the present invention, to the emission of waves or acoustic signals, and the terms "waves, acoustic signals" and "acoustic sounding instruments" etc., are employed herein by imparting to the qualifying word "acoustic" a very broad meaning, comprising not only the waves emitted within the range of the audible frequencies, but also supersonic, infrasonic, and shock waves.

The acoustic sounding or probing tools or instruments which are still utilized to this day generally comprise an emitter operating with either magnetostriction or electrostriction (emission frequency comprised between 10,000 and 40,000 Hz), consisting of a cylinder that may be made either from iron or an iron alloy, which cylinder is surrounded by an excitation winding in the case of the emitter operating with magnetostriction.

It should be noted, however, that the present invention is not limited to the emission and to the reception of acoustic signals, but is applicable in all those applications where it is desired to produce an emitting of signals at a first level of a probing operation and a receiving at a second level of the probing operation of signals corresponding to the signals being emitted which have passed through the geological formations between the first and the second level, when the intensity of the signals being received is liable to be influenced by the shape of the cross section of the borehole and/or by inaccuracies in the centering of the emitter-receiver device in this hole. More particularly, it will be possible to build an emitter-receiver device according to the present invention which comprises an emitter and a receiver with neutrons in the place of an acoustic emitter and an acoustic receiver, or a cylinder made from lead zirconate which is metallized on the end faces thereof in the case of an emitter operating with electrostriction, this cylinder having a diameter essentially equal to the height thereof (between four and 10 centimeters) and the axis thereof being disposed parallel to the axis of the sounding instrument hole. The emitter cylinder bathes in oil and is sheathed with rubber.

The sounding or probing instrument is generally equipped with centering means, for example, plate centering means disposed respectively above and below the active unit of the sounding instrument consisting of the emitter and the receiver.

The acoustic waves being emitted are approximately spherical. They initially pass through the oil surrounding the coiled core, then the rubber sheath or casing, before being propagated in the liquid mud or sludge which separates the sounding instrument from the wall of the well and transmits these waves to the terrain surrounding the hole at that level. During the course of the propagation of these waves, the wave length thereof is from 0.10 to 0.30 meters in the mud and greater (up to one meter) in the formations surrounding the sounding instrument hole.

It should be noted, however, that these waves which are propagated essentially in the radial direction of the emitter cylinder are not exactly spherical. The waves being emitted reach the different formations surrounding the sounding instrument hole in phase provided the emitter is centered and provided the hole has an essentially circular cross section.

The reception of the acoustic signals which have traversed the geological layers is carried out with a receiver which in general also is either of the magnetostriction or electrostriction type, and is positioned at a certain distance from the emitter. The axis of the receiver is also parallel to that of the sounding hole, while being coincident with the latter if the sounding or probing instrument is equipped with centering means, as has been set forth hereinabove. This receiver has a construction analogous to that of the emitter, and the emitter and receiver are frequently designated by the term "acoustic transducers".

The wave trains which are propagated in the geological formations surrounding the sounding hole and which arrives at the receiver along the different directions surrounding the axis of the hole are in phase at the receiver if the receiver is likewise centered, and if the cross section of the hole is circular.

When there is a defect with respect to the centering, or when the cross section of the sounding hole or cavity is not circular, phase shifts are introduced in the form of variations in the intensity of the signal collected by the receiver according to the orientation and inclination of the sounding instrument in the well, at the same level therewith, even if the geological formations have identical characteristics all around the sounding or probing area.

It is therefore an essential object of the present invention to provide an emitter-receiver device in which the received signals emanating from different directions around the axis of the sounding or probing area are not affected by phase shifts due to the shape of the cross section of the well, so as to thereby eliminate the problems pertaining to the centering of the emitter-receiver device in the well.

It is another object of the present invention to provide for a sounding or probing instrument capable of carrying out the determination of the characteristics of the terrain located in the immediate vicinity of two generator lines of this well, that is to say, having an exploring or scanning capacity greater than that of a sounding instrument in which the emitter and the receiver are disposed on the same block or support along a single generatrix of the well.

These objects are obtained, in accordance with the present invention, with the aid of a device for emitting and receiving signals in a sounding hole with a view toward determining the characteristics of the geological formations surrounding this hole, characterized in that it is equipped with means for establishing a contact with the wall of the hole at points located essentially in the same diametrical plane on both sides of the axis of this hole and comprises at least one pair of transducers including an emitter and receiver, in which the emitter and the receiver are disposed so as to be positioned one below the other essentially in this diametrical plane on both sides of the axis of the hole and in proximity to the wall thereof at distances which are essentially equal with respect to this wall.

In the non-limiting embodiments of the present invention, as disclosed herein, the emitter comprises an active element having a general configuration essentially in the form of a cylinder of revolution emitting into the ground acoustic signals principally from the lateral surface thereof (which thus constitutes the essential point of its active surface). In an analogous fashion, the receiver comprises an element also having a general configuration essentially in the form of a cylinder of revolution which receives the acoustic signals principally at the lateral surface thereof, thus constituting the essential point of its active surface. This preferential embodiment for emission and reception is obtained with an appropriate dimensioning of the aforementioned cylindrical elements of the emitter and of the receiver.

Such acoustic transducers (emitters and receivers) are well known. They may consist, for example, of solid cylindrical elements made from an electrostrictive material (ceramic material containing lead salts), the end faces of these cylinders being metallized and connected to an electric excitation circuit (emitter) or an electric detection circuit (receiver). They may also consist of a hollow cylinder made from electrostrictive material forming a ring, the exterior and interior lateral faces of this ring being metallized. In another embodiment of the present invention, the transducers are of the magnetostrictive type comprising a hollow cylinder consisting of an annular core made from iron cobalt or from iron silicon on to which an electric wire is wound and connected to either an excitation or detection circuit.

According to a preferred embodiment of the present invention, the emitter and the receiver mentioned above are respectively integral with two supports which may consist of elastic plates or foils designed to be applied against the wall of the hole, thereby forming springs.

Non-limiting embodiments of the present invention will now be described in further detail hereinbelow with reference to the accompanying drawings, wherein:

FIG. 3 illustrates, by way of example, an embodiment of a sounding instrument according to the present invention having two receivers.

FIG. 4 is a diagram with an enlarged scale of the mounting or assembly of an emitter and of a receiver in such a sounding instrument;

FIG. 5 is a diagram of a rotary connection between the emitter-receiver device and the lower end of the cable on which this device is suspended in the sounding or probing operation.

FIG. 1 illustrates schematically a first embodiment of the present invention in which the emitter cylinder T and the receiver cylinder R for emitting and receiving the acoustic signals are disposed horizontally, which means that the axes thereof are parallel to the axis of the well.

According to the present invention, the emitter T and the receiver R are disposed one below the other so that the axes thereof are in the same diametrical plane of the well on respective sides of the axis of the borehole, and in proximity to the wall of the well with the same distance "$e$" from that wall.

Under these conditions, those waves from among the waves emitted by the emitter T which arrive at the receiver R, after having been refracted parallel to the axis of the well along a cylindrical surface 3 (FIG. 1A) in the terrain surrounding the sounding or probing area, following either one or the other of the two paths or courses 1 and 2 positioned in the same diametrical plane as the centers of emitter T and receiver R, will travel over or extend through paths having the same length in the geological formations surrounding the sounding or probing area, irrespective of this diametrical plane, and consequently will reach the receiver R in phase, if the formations in question are the same all around the sounding or probing area.

Figure 1A:
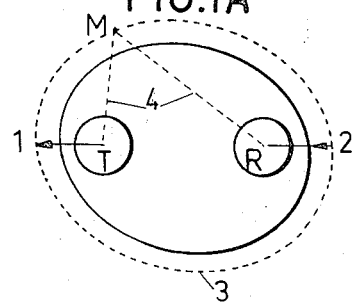
FIG. 1A is a view of this first embodiment taken from a point located on the axis of the well.

The waves whose course or path deviates somewhat from the diametrical plane will travel over a path such as that indicated by reference numeral 4 in FIG. 1A, whose length differs little from that of the paths 1 and 2 insofar as the cylindrical surface 3 on the generatrix M from which the wave is propagated has a cross section whose configuration deviates little from that of an ellipse, at the focuses of which the transducers T and R are positioned (the distance MT + MR then remaining essentially constant regardless of the position of M around the axis of the well).

Figure 1:
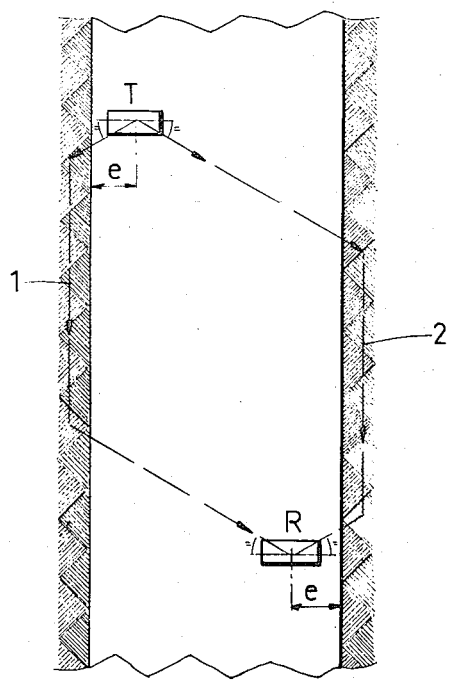
FIG. 1 is a schematic diagram in a first plane extending through the axis of the sounding hole of the first embodiment of the emitter and of the receiver, to be used according to the present invention in a device for emitting and receiving acoustic signals.
Figure 2:
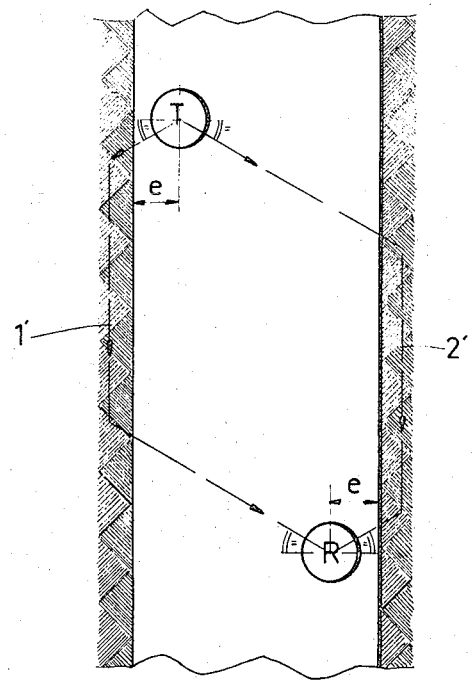
FIG. 2 is a diagram of a second embodiment which can be adopted for an acoustic signal emitting-receiving device.
Figure 2A:
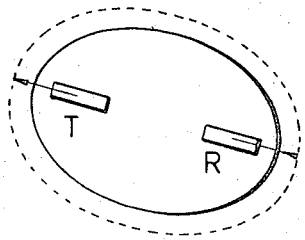
FIG. 2A shows this second embodiment of the present invention viewed from a point located on the axis of the well.

According to a further embodiment of the present invention illustrated in FIGS. 2 and 2A, the axis of the emitter cylinder T and that of the receiver cylinder R are disposed perpendicularly to the diametrical plane in which transducers T and R are positioned, the mean cross-sectional planes of the emitter cylinder and of the receiver cylinder then being essentially coextensive.

Under these conditions, the waves which are emitted essentially in a radial direction from the cylindrical surface of emitter T will deviate or diverge only very slightly from the diametrical plane containing the emitter and the receiver and travel over or extend through paths or courses such as those indicated at 1' and 2' in FIG. 2, whose lengths are very substantially equal, the signals thus arriving in phase at the receiver R.

Figure 2B:
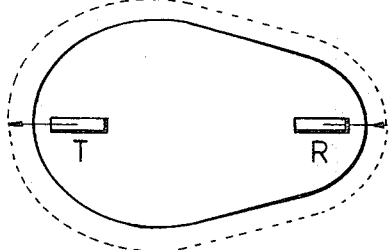
FIG. 2B is a view analogous to the second embodiment of the present invention, placed in a hole having an irregular cross section, as may occur in connection with a drilling operation.

This result is obtained regardless of the position taken in the well by the emitter-receiver device, and regardless of the form or shape of the cross section of the well itself, even if, as a consequence of an irregular drilling, this cross section has the shape of a "keyhole", as illustrated in FIG. 2B. It should be understood, however, that in the case of a sounding or probing hole having an ovalized cross section, there is the advantage that the emitter-receiver device according to the invention assumes a stable position, for example, that for which the plane containing the centers of the emitter-receiver is placed along the greatest diameter of the hole (FIG. 2B).

As illustrated in FIGS. 3 to 5, the above-mentioned result may be obtained by providing the emitter-receiver device with plates or foils forming springs which are applied against the walls of the well along the generatrix thereof, these plates or foils being advantageously used in combination with a rotary connection 5 (FIGS. 3 and 5) between the emitter-receiver device and the cable carrier 6 (equipped with electric conductors) on which this device is suspended, so as to render it possible for the device in question to assume (due to the action of the plates or foils) a stable orientation at each level of the well without any possible risk that a twisting of the cable during the winding or unwinding thereof at the surface in the course of lowering or raising the device either into or out of the sounding hole or cavity will cause or bring about an inopportune rotation of the device about itself.

The embodiment of the present invention shown in FIG. 3 comprises an emitter T and two acoustic receivers $R_1$ and $R_2$ which make it possible to collect at two different levels of the well the signals coming from emitter T through the geological layers surrounding the sounding or probing area between the emitter and the receivers.

This device comprises a sounding tool body consisting of a frame 7 which is elongated in the direction of the axis of the well and connected to the cable 6 by means of the rotary connection 5, this frame 7 being ballasted at L at its lower portion. The ballast L allows for the lowering of the relatively light device into a possibly dense mud or sludge. For a sounding or probing hole having a diameter of 20 centimeters, the frame as used will have, for example, a length of approximately two meters and a width of 10 centimeters. This frame carrying the emitter T and the receivers $R_1$ and $R_2$ is made from a material which transmits the acoustic waves being emitted at a speed clearly outside of the range of the speeds of propagation of these waves in the geological formations being considered herein. The frame 7 is made, for example, from plastic material or from glass fibers, or from metal sheathed with an elastomer or with a plastic material.

The frame in question comprises, in the same diametrical plane as the borehole, elastic plates or foils 8 to 13 providing a spring action when in contact with the wall of the hole, these plates or foils being fastened at the ends thereof to transverse bars 14 to 19 of the frame 7. Some of these bars, namely the bars 15, 17, and 19, are rigidly secured to the frame 7, while the others (bars 14, 16, and 18) are adapted to glide along vertical posts 20 and 21 of the frame 7, so as to be able to follow the elastic deformations of the plates or foils 8 to 13. For the same reason at least one of the ends of each plate or foil is advantageously hingedly disposed on the transverse bar to which it is connected (joints 14a, 16a, and 18a, FIG. 3).

The posts 20 and 21 and the bars 15, 17, and 19 of the frame 7 are advantageously hollow so as to allow for the accommodation therein of the electric supply conductors and of the information transmitting conductors which are connected to the emitter T and to the receivers $R_1$ and $R_2$.

As disclosed in FIGS. 3 and 4, the latter being a partial view of FIG. 3 at an enlarged scale, the centers of the emitter T and of the receivers $R_1$ and $R_2$ are disposed in a manner so as to be positioned in the same diametrical plane of the well; the receivers being positioned on the side opposite the emitter with respect to the axis of the well.

The emitter and the receivers are each fastened to an elastic plate or foil at the same distance "$e$" (FIG. 4) from the contact point between this plate and the wall of the well. The different elastic plates have essentially identical elasticity characteristics so that the distance between the center of the emitter and the wall of the well remains very essentially equal to that between the wall and the center of each receiver respectively, regardless of the diameter of the well.

The elastic plates or foils may consist, for example, of a metallic core which is covered entirely either with a plastic material or with an elastomer. The curved configuration of these elastic plates renders it possible for them to adapt to the different diameters of the sounding hole. Different sets of elastic plates may be provided for, corresponding to different curvatures of these plates, if the device according to the present invention is susceptible to being used in sounding holes having variable diameters, so that it is possible to change these plates whenever the sounding or probing operation is changed.

In the example shown in FIGS. 3 and 4, the emitter T and the receivers $R_1$ and $R_2$ are fastened to the elastic plates 8, 11, and 13, respectively. With the arrangement corresponding to the embodiment of the present invention as illustrated scematically in FIGS. 2, 2A, and 2B, the axes of the emitter and of the receivers are disposed horizontally.

The emitter and the receivers may be of any known type, operating either by magnetostriction or electrostriction, and such models of emitters and of receivers which are capable of operating in sounding or probing operations at temperatures in the order of 200°C. are available commercially.

The elastic plates 8 to 13 advantageously include openings or windows, such as 22 to 25 (FIG. 4), disposed on the path of the acoustic waves between the emitter and one receiver. The opening angle of these windows may be determined in a sufficiently approximate fashion on the basis of the formula $$\sin i/\sin i' = V'/V$$

wherein $i$ and $i'$ designate the angles which the mean rays of propagation of the waves emanating from T and collected by one or the other of the receivers $R_1$ or $R_2$, respectively, form with the horizontal, when these rays penetrate into the terrain surrounding the well (angle $i$) and when they are refracted parallel to the axis of the well (angle $i' = 90°$), V and V' representing respectively the value of the speed of propagation of the waves in the drilling mud and in the geological formation being considered.

By taking for V' successively the lowest and the highest speed of propagation of the waves being emitted in the geological formations being encountered, it is possible to calculate the extreme values $i_1$ and $i_2$ of the angle of incidence $i$. In order to further establish these concepts, and without these values constituting any limitations for the device according to the present invention as should be understood, it may be indicated that the value of $i_1$ is in general near 15° and that of $i_2$ is near 60°.

The windows 22 to 25 may also be provided for by making the plates 8 to 13 in the form of small forks whose branches are directly hinged or articulated at the lower end thereof on the posts or uprights 20 and 21, which would make it possible to reduce the number of articulations.

Figure 6:
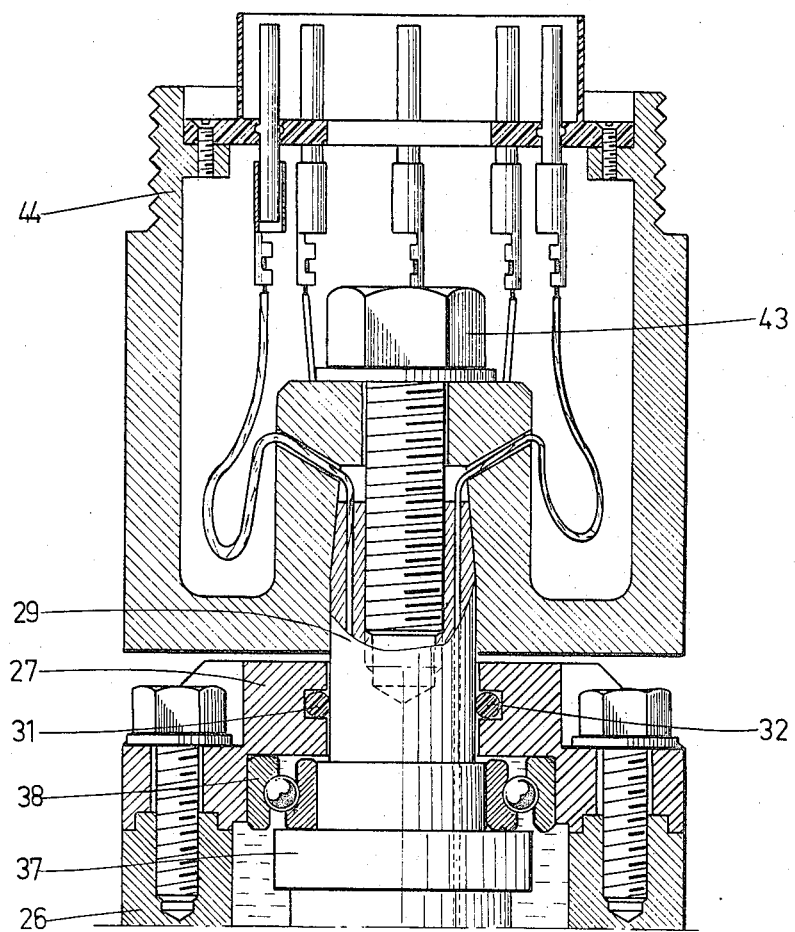
FIG. 6 shows a device for linking this rotary connection to a connecting terminal of conventional type.

In the embodiment of the present invention illustrated in FIGS. 5 and 6, the rotary connection 5 comprises a tubular body 26 whose lower end is integral with the frame 7. This body is closed at the upper portion thereof by a cover 27 comprising a central bore 28 to allow for the passage of a tube 29 containing the electric conductors 30a to 30g for carrying the supply and measurement voltages.

The fluid-tightness between the wall of the tube 29 and that of the bore 28 is assured by means of at least one toric seal 31 accommodated in a recess 32. The tube 29 is extended toward the bottom by means of a mandrel 33 carrying as many conductive rings as there are conductors 30 (rings 34a to 34g), these rings being separated from each other and from the mandrel 33 by means of insulating rings.

In wiping contact with the conducting rings 34a to 34g, brushes 35a to 35g are disposed in the radial housings, these brushes being supported against the rings 34a to 34g by means of springs held in position by threaded stoppers 36a to 36g with the interposition of small plates and of insulating rings.

The cover 27 forms an annular abutment or stop for retaining the frame 7, this abutment cooperating with a corresponding annular shoulder portion 37, which is integral with the mandrel 33, with the interposition of a ball bearing 38. Another ball bearing, namely, the ball bearing 39, assures the centering of the lower end of the mandrel 33.

The tubular body 26 is completely filled with a fluid which is not very compressible, such as oil, whose pressure is put in equilibrium with the exterior pressure, which is that of the drilling mud, with the aid of means that may consist of at least one membrane 40 having a free surface sufficient to permit the pressures to be equalized, which membrane is maintained in place by means of a small round disk 41 operatively connected with the tubular body 26 by screws. Channels 42 facilitate the balancing of the pressures on both sides of the membrane.

The brushes 35a to 35g are connected with electric conductors which are in turn connected with the emitter and with the receivers of the device shown in FIGS. 3 and 4.

In the embodiment illustrated in FIG. 6, the rotary connection of FIG. 5 is linked by means of a screw 43 to the terminal 44 of a connector such as currently used for connecting a diagraph sounding instrument with the cable carrier thereof.

What is claimed is:

1. A device for emitting and receiving signals in a sounding hole, with a view toward determining the characteristics of the geological formations surrounding this hole, comprising at least one pair of transducers including one emitter and one receiver, and means for supporting the emitter and the receiver one below the other essentially in the same diametrical plane of the hole, said emitter and said receiver being disposed on opposite sides of the axis of the hole and in proximity to the wall of the hole at essentially predetermined equal distances from that wall, said supporting means includes an elongated frame capable of being suspended in the sounding hole, said frame comprising at a first level at least two elastic support members disposed essentially in the same plane adapted to contact the wall of the sounding hole at points positioned on respective sides of the axis of the hole, said frame comprising at least one elastic support member positioned at a second level distinct from said first level, said elastic support members at said first and second level carrying, respectively, said emitter for effecting emission of signals in the geological formations surrounding the sounding hole and said receiver for receiving signals emanating from these formations, said emitter and said receiver being positioned essentially in the same plane extending through the axis of the frame on respective sides of this axis and at essentially equal distances from the wall of the sounding hole.

2. A device according to claim 1, wherein said emitter and said receiver of said pair comprise elements having a general configuration in the form of an essentially cylindrical body of revolution whose active surface consists essentially of the lateral cylindrical surface thereof and whose axes are disposed essentially in a direction parallel to the axis of the sounding hole.

3. A device according to claim 1, wherein said emitter and said receiver of said pair comprise elements having a general configuration in the form of an essentially cylindrical body of revolution whose active surface consists essentially of the lateral cylindrical surface thereof and whose axes are disposed essentially in a direction perpendicular to the axis of the sounding hole, the mean cross-sectional planes of these cylindrical elements being essentially coextensive.

4. A device according to claim 1, wherein said first and second elastic support members at said first and said second levels are disposed in the same plane, and in that said emitter and said receiver are fastened to support members having the same elasticity, said emitter and receiver being disposed in proximity to and at an equal distance from the contact points of these support members with the wall of the sounding hole.

5. A device according to claim 1, wherein said frame includes two vertical posts connected with transverse bars, each of said elastic support members being fastened at a first one of the extremities thereof to a bar which is integral with the vertical posts and at the second extremity thereof to a bar mounted in a gliding fashion along said posts.

6. A device according to claim 4, and further including a cable carrier for supporting said supporting means and rotary linkage means connecting said frame to said cable carrier so that the orientation of said frame in the sounding hole is removed from the influence of a possible torsion of the cable carrier.

7. A device according to claim 1 wherein said elastic support members are provided in the form of two elastic rings having a diameter substantially equal to the diameter of the sounding hole.

8. A device according to claim 1, wherein means are provided for establishing a contact with the wall of the hole at points located substantially in the same plane on respective sides of the axis of the hole.

9. A device for emitting and receiving signals in a sounding hole, with a view toward determining the characteristics of the geological formations surrounding this hole, comprising at least one emitter and one receiver, and means for supporting the emitter and the receiver one below the other essentially in the same diametrical plane of the hole on respective sides of the axis of the hole and in proximity to the wall of the hole at essentially predetermined equal distances from that wall, said supporting means includes an elongated frame capable of being suspended in the sounding hole, said frame comprising at a first level at least two elastic support members disposed essential in the same plane adapted to contact the wall of the sounding hole at points positioned on respective sides of the axis of the hole, said frame comprising at least two elastic support members positioned at a second level distinct from said first level, said elastic support members at said first and second levels, respectively, carrying said emitter for effecting emission of signals in the geological formations surrounding the sounding hole and said receiver for receiving signals emanating from these formations, said emitter and said receiver being positioned essentially in the same plane extending through the axis of the frame on respective sides of this axis and at essentially equal distances from the wall of the sounding hole, and at least certain ones of said elastic members are equipped with openings on the mean path of said signals.

10. A device according to claim 9, in which said frame consists of two vertical posts connected by transverse bars, said members having the form of forks whose branches are directly articulated at the lower end thereof on said vertical posts of said frame.

* * * * *